US009726239B2

(12) United States Patent
Kleinhardt et al.

(10) Patent No.: US 9,726,239 B2
(45) Date of Patent: Aug. 8, 2017

(54) CLUTCHED POWER TRANSMITTING DEVICE WITH REDUCED LAG TIME FOR ACTUATION

(71) Applicant: American Axle & Manufacturing, Inc., Detroit, MI (US)

(72) Inventors: Robert S. Kleinhardt, Detroit, MI (US); John C. Hibbler, Lake Orion, MI (US); Charles G. Stuart, Rochester Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 135 days.

(21) Appl. No.: 14/644,314

(22) Filed: Mar. 11, 2015

(65) Prior Publication Data

US 2016/0265599 A1 Sep. 15, 2016

(51) Int. Cl.
F16D 48/02 (2006.01)

(52) U.S. Cl.
CPC ...... *F16D 48/02* (2013.01); *F16D 2048/0203* (2013.01); *F16D 2048/0245* (2013.01); *F16D 2048/0248* (2013.01); *F16D 2048/0269* (2013.01)

(58) Field of Classification Search
CPC ............. F16D 48/02; F16D 2048/0203; F16D 2048/0245; F16D 2048/0248; F16D 2048/0269
See application file for complete search history.

(56) References Cited

U.S. PATENT DOCUMENTS

| 2,214,817 A | 9/1940 | Harrington |
| 2,677,238 A | 5/1954 | Greer |
| 2,877,794 A | 3/1959 | Chasser |
| 2,984,980 A | 5/1961 | Rowles et al. |
| 3,541,791 A | 11/1970 | Lvovsky et al. |
| 3,905,459 A * | 9/1975 | Liebich .................. F16D 48/02 138/30 |
| 8,069,661 B2 | 12/2011 | Hendrickson et al. |
| 8,429,907 B2 | 4/2013 | Gronli |
| 9,174,632 B2 * | 11/2015 | DeGowske ............. F16D 48/02 |
| 2013/0333366 A1 * | 12/2013 | Grethel .................. F16D 48/02 60/327 |

* cited by examiner

*Primary Examiner* — Richard Lorence
(74) *Attorney, Agent, or Firm* — Harness, Dickey & Pierce, P.L.C.

(57) ABSTRACT

A power transmitting component can include a friction clutch, a ram, a pump, a fluid storage device and a valve. The ram can have a piston chamber and a piston movable therein between a first and second position to engage the friction clutch. A first inlet/outlet of the pump can be fluidly coupled to a reservoir. The fluid storage device can hold pressurized hydraulic fluid. The valve can be fluidly coupled with the piston chamber, a second inlet/outlet of the pump, and the fluid storage device. When in a first mode, the valve can permit fluid communication between the pump and the fluid storage device, inhibit fluid communication between the piston chamber and the pump, and inhibit fluid communication between the piston chamber and the fluid storage device. When in a second mode, the valve can permit fluid communication between the pump, the fluid storage device, and the piston chamber.

8 Claims, 4 Drawing Sheets

CLUTCHED POWER TRANSMITTING DEVICE WITH REDUCED LAG TIME FOR ACTUATION

FIELD

The present disclosure relates to clutched power transmitting devices with reduced lag times for actuation.

BACKGROUND

This section provides background information related to the present disclosure which is not necessarily prior art.

Hydraulically operated clutches generally include a piston which applies force to the clutch system to engage a plurality of clutch plates. In order for the clutch plates to reach maximum separation for low drag torque, the piston must retract a considerable distance from the point of engagement. Typically, for the piston to move from the fully retracted position to engage the clutch plates quickly, a high flow of hydraulic fluid to the piston is required during this initial actuation. As the clutch plates are not engaged during this initial movement of the piston, the fluid can be provided at a lower pressure. Once the clutch plates begin to engage, the piston has less distance to travel before the clutch is fully engaged, thus the high flow rate is no longer needed. Instead, a higher pressure is required to force the clutch plates into complete engagement.

Typically, the pressure developed by a fixed displacement hydraulic pump (e.g. a gerotor pump) is directly related to the pump's input torque, and inversely related to the pump's fluid displacement, while the flow rate is directly related to the pump's fluid displacement and rotational speed. As a result, it can be difficult to satisfy requirements for low power consumption, high flow rate, and high pressure, while simultaneously maintaining simplicity, low cost, and robustness of a fixed displacement pump.

SUMMARY

This section provides a general summary of the disclosure, and is not a comprehensive disclosure of its full scope or all of its features.

The present teachings provide for a power transmitting component including a friction clutch, a reservoir, a hydraulic ram, a pump, a fluid storage device and a first valve. The friction clutch can have a plurality of first clutch plates and a plurality of second clutch plates that can be interleaved with the first clutch plates. The reservoir can be configured to hold hydraulic fluid. The hydraulic ram can be coupled to the friction clutch. The hydraulic ram can have a piston chamber and a piston that can be movable in the piston chamber between a first position which can be retracted relative to the first and second clutch plates, and a second position in which the piston can be extended toward the first and second clutch plates to a greater extent than when the piston is in the first position. The pump can have a first inlet/outlet and a second inlet/outlet. The first inlet/outlet can be coupled for fluid communication to the reservoir. The fluid storage device can be configured to hold a volume of pressurized hydraulic fluid. The first valve can be coupled for fluid communication with the piston chamber, the second inlet/outlet of the pump, and the fluid storage device. The first valve can be operable in a first mode and a second mode. The first valve can be configured to permit fluid communication between the pump and the fluid storage device, to inhibit fluid communication between the piston chamber and the pump, and to inhibit fluid communication between the piston chamber and the fluid storage device when the first valve is in the first mode. The first valve can be configured to permit fluid communication between the pump, the fluid storage device, and the piston chamber when the first valve is in the second mode.

The present teachings further provide for a power transmitting component including a friction clutch, a reservoir, a hydraulic ram, a pump, a fluid storage device, a first valve, a second valve, and a third valve. The friction clutch can have a plurality of first clutch plates and a plurality of second clutch plates that can be interleaved with the first clutch plates. The reservoir can be configured to hold a hydraulic fluid. The hydraulic ram can be coupled to the friction clutch. The hydraulic ram can have a piston chamber and a piston that can be movable in the piston chamber between a first position which can be retracted relative to the first and second clutch plates, and a second position in which the piston can be extended toward the first and second clutch plates to a greater extent than when the piston is in the first position. The pump can have a first inlet/outlet and a second inlet/outlet. The second inlet/outlet can be coupled for fluid communication with the piston chamber. The pump can be operable in a forward mode and a reverse mode. In the first mode, the pump can be configured to pump fluid from the first inlet/outlet to the second inlet/outlet. In the reverse mode, the pump can be configured to pump fluid from the second inlet/outlet to the first inlet/outlet. The fluid storage device can be configured to hold a volume of pressurized hydraulic fluid. The first valve element can be disposed between the fluid storage device and the piston chamber. The first valve element can be configured to permit fluid communication from the fluid storage device to the piston chamber. The second valve element can be disposed between the first inlet/outlet and the fluid storage device. The second valve element can be configured to permit fluid communication from the first inlet/outlet to the fluid storage device and can inhibit fluid communication from the fluid storage device to the first inlet/outlet. The third valve element can be disposed between the first inlet/outlet and the reservoir. The third valve element can be configured to permit fluid communication from the reservoir to the first inlet/outlet. The first, second, and third valve elements can be configured to permit the pump to pump hydraulic fluid from the reservoir to the piston chamber when operated in the forward mode, and can permit the pump to pump hydraulic fluid from the piston chamber to the fluid storage device when operated in the reverse mode.

The present teachings further provide for a power transmitting component including a friction clutch, a reservoir, a hydraulic ram, a pump, a fluid storage device, a first valve element, and a second valve element. The friction clutch can have a plurality of first clutch plates and a plurality of second clutch plates that can be interleaved with the first clutch plates. The reservoir can be configured to hold a hydraulic fluid. The hydraulic ram can be coupled to the friction clutch. The hydraulic ram can have a piston chamber and a piston that can be movable in the piston chamber between a first position which can be retracted relative to the first and second clutch plates, and a second position in which the piston can be extended toward the first and second clutch plates to a greater extent than when the piston is in the first position. The pump can have a first inlet/outlet and a second inlet/outlet. The first inlet/outlet can be coupled for fluid communication to the reservoir. The second inlet/outlet can be coupled for fluid communication with the piston chamber. The fluid storage device can be configured to hold a volume of pressurized hydraulic fluid. The first valve element can be disposed between the fluid storage device and the piston chamber. The first valve element can be configured to permit fluid communication from the second inlet/outlet to the fluid storage device and to inhibit fluid communication from the fluid storage device to the piston chamber and the second inlet/outlet. The second valve element can be disposed between the fluid storage device and the piston chamber. The second valve element can be configured to permit fluid communication from the fluid storage device to the piston chamber and to inhibit fluid communication from the piston chamber and the second inlet/outlet to the fluid storage device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
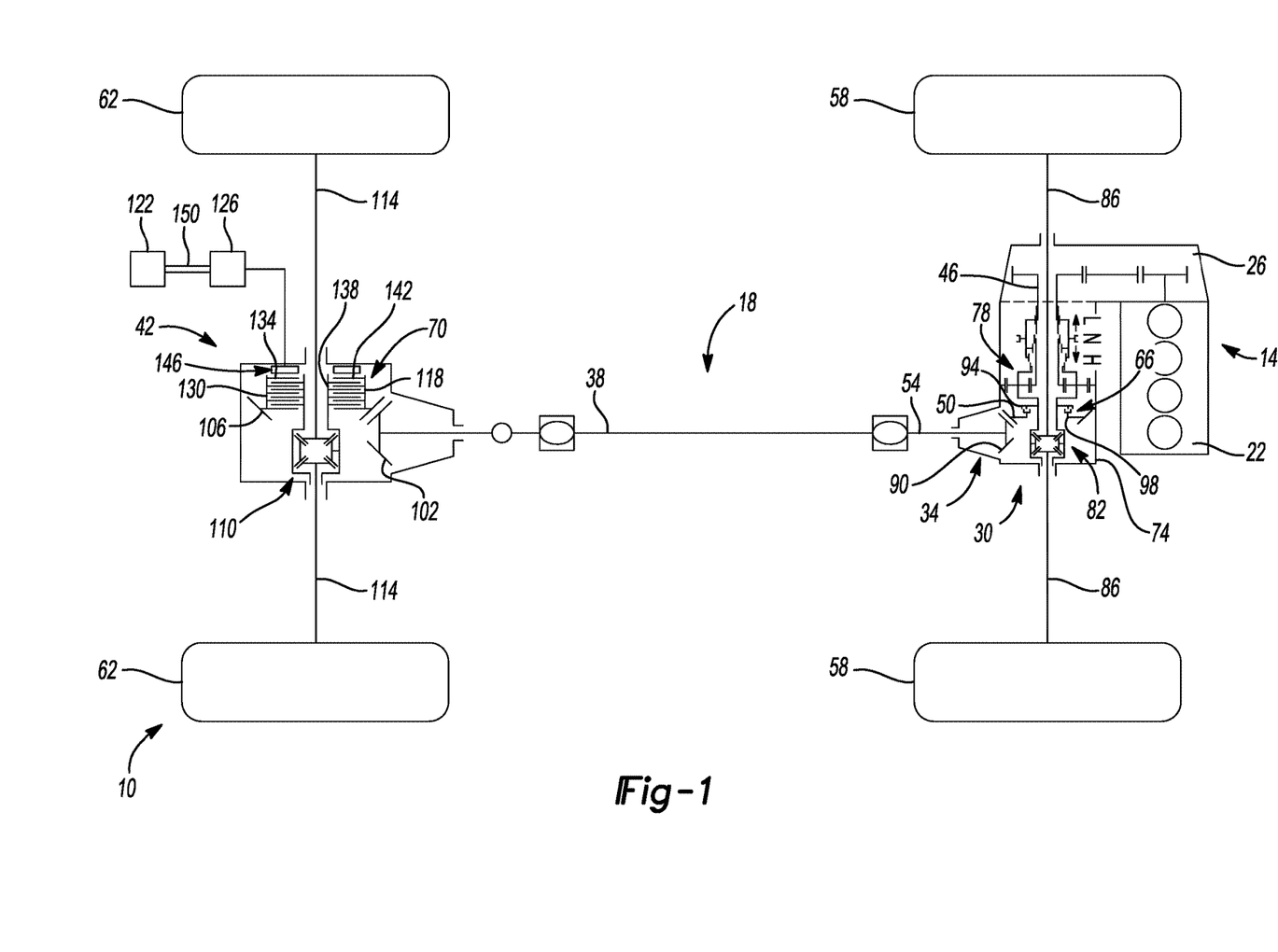
FIG. 1 is an exemplary vehicle having a power transmitting component constructed in accordance with the present teachings.

With reference to FIG. 1 of the drawings, an exemplary vehicle having clutches that can be actuated by a power transmitting component constructed in accordance with the teachings of the present disclosure is generally indicated by reference numeral 10. The vehicle 10 can have a power train 14 and a drive line or drive train 18. The power train 14 can be conventionally constructed and can comprise a power source 22 and a transmission 26. The power source 22 can be configured to provide propulsive power and can comprise an internal combustion engine and/or an electric motor, for example. The transmission 26 can receive propulsive power from the power source 22 and can output power to the drive train 18. The transmission 26 can have a plurality of automatically or manually-selected gear ratios. The drive train 18 in the particular example provided is of an all-wheel drive configuration, but those of skill in the art will appreciate that the teachings of the present disclosure are applicable to other drive train configurations, including four-wheel drive configurations, rear-wheel drive configurations, and front-wheel drive configurations for example.

The drive train 18 can include a front axle assembly 30, a power take-off unit (PTU) 34, a prop shaft 38 and a rear axle assembly 42. An output of the transmission 26 can be coupled to an input of the front axle assembly 30 to drive an input member 46 of the front axle assembly 30. The PTU 34 can have a PTU input member 50, which can receive rotary power from the input member 46 of the front axle assembly 30, and a PTU output member 54 that can transmit rotary power to the prop shaft 38. The prop shaft 38 can couple the PTU output member 54 to the rear axle assembly 42 such that rotary power output by the PTU 34 is received by the rear axle assembly 42. The front axle assembly 30 and the rear axle assembly 42 could be driven on a full-time basis to drive front and rear vehicle wheels 58 and 62, respectively. It will be appreciated, however, that the drive train 18 could include one or more clutches to interrupt the transmission of rotary power through a part of the drive train 18. In the particular example provided, the drive train 18 includes a first clutch 66, which can be configured to interrupt the transmission of rotary power into or through the PTU 34, and a power transmitting component 70, which can be configured to control rotation of components within the rear axle assembly 42.

The front axle assembly 30, the PTU 34 and the first clutch 66 can be mounted in a housing assembly 74. The front axle assembly 30 can include the input member 46, a two-speed transmission 78, a front differential assembly 82 and a pair of front axle shafts 86. The input member 46 can be a hollow shaft that can be configured to engage with the output member of the transmission 26. The input member 46 can be configured to engage with the two-speed transmission 78. The two-speed transmission 78 can be configured to engage the first clutch 66 and the front differential assembly 82.

The front differential assembly 82 can be coupled to the front axle shafts 86 and permit speed differentiation between the front axle shafts 86. In the example provided, the front differential assembly 82 is an open differential. It will be appreciated, however that other speed differentiation means could be employed in the alternative, such as one or more clutches, a locking differential or a limited slip differential for example.

The PTU 34 can include the PTU input member 50, a pinion gear 90 and the PTU output member 54. The PTU input member 50 can comprise a bevel ring gear that is mounted in the housing assembly. The pinion gear 90 can be meshingly engaged to the bevel ring gear of the PTU input member 50 and can be aligned along an axis that is generally perpendicular to the rotational axis of the input member 46. If desired, the pinion gear 90 can be a hypoid pinion gear. The PTU output member 54 can be coupled to the pinion gear 90 for rotation therewith.

The first or mode clutch 66 can be any type of clutch, including a friction clutch or a synchronizer for example. In the particular example provided, the mode clutch 66 is a dog clutch having a clutch input member 94 and a clutch output member 98. The clutch input member 94 can be coupled to the two-speed transmission 78 for rotation therewith. The clutch output member 98 can be non-rotatably coupled to the bevel ring gear of the PTU input member 50. The mode clutch 66 can be operable for selectively transmitting rotary power between the clutch input member 94 and the clutch output member 98.

The rear axle assembly 42 can include an input pinion 102, a bevel ring gear 106, a second differential assembly 110, a pair of second shafts 114, and the power transmitting component 70. The input pinion 102 can be coupled to an end of the propshaft 38 for rotation therewith. The second bevel ring gear 106 can be meshingly engaged with the input pinion 102. The second differential assembly 110 can be configured to receive rotary power transmitted through the second bevel ring gear 106 and to transmit that rotary power to the second shafts 114. The second differential assembly 110 can have a means for permitting speed differentiation between the second shafts 114. In the example provided, the speed differentiation means comprises an open differential.

The power transmitting component 70 can include a second clutch 118, a motor 122, and a hydraulic system 126. The second clutch or axle disconnect clutch 118 of the power transmitting component 70 can be configured to selectively interrupt power transmission through the second differential assembly 110. The axle disconnect clutch 118 can be any type of clutch and can be mounted coaxially with the second differential assembly 110. In the particular example provided, the axle disconnect clutch 118 includes a clutch input member 130, a plurality of first clutch plates 134, a clutch output member 138, a plurality of second clutch plates 142, and an actuator 146. The clutch input member 130 can be coupled to the bevel ring gear 106 for rotation therewith. The plurality of first clutch plates 134 can be non-rotatably coupled to the clutch input member 130. The clutch output member 138 can be coupled to the second differential assembly 110 to provide rotary power thereto. The plurality of second clutch plates 142 can be non-rotatably coupled to the clutch output member 138. The first and second clutch plates 134 and 142 can be interleaved friction plates and the actuator 146 can be employed to compress the first and second clutch plates 134 and 142 so that they frictionally engage one another so that rotary power can be transmitted from the bevel ring gear 106 through the axle disconnect clutch 118 and to the second differential assembly 110. When the actuator 146 is disengaged so that rotary power is not transmitted through the axle disconnect clutch 118, the rear wheels 62 will drive the second shafts 114, but the axle disconnect clutch 118 inhibits the transmission of rotary power into the bevel ring gear 106. In this way, operation of the vehicle 10 in a front-wheel drive mode will not permit the rear wheels 62 to "back drive" the bevel ring gear 106. In the example provided, the motor 122 is an electric motor, though any suitable type of motor can be used. The motor 122 can be drivingly coupled to the hydraulic system 126 by an output shaft 150 and the hydraulic system 126 can be coupled for fluid communication with the actuator 146.

Figure 2:
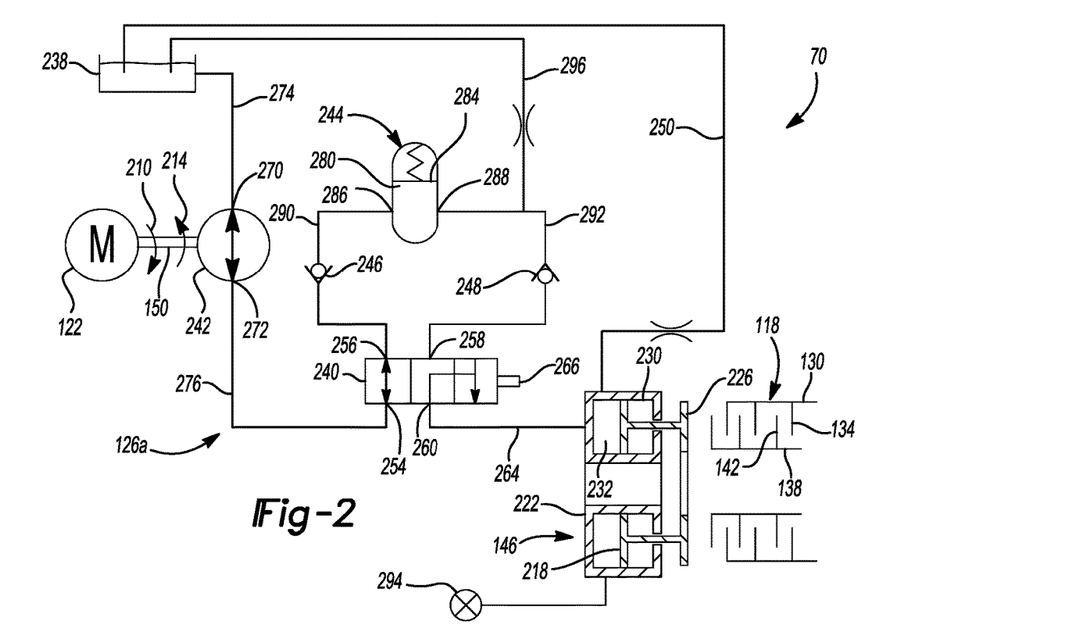
FIG. 2 is a schematic illustration of the power transmitting component of FIG. 1 of a first construction.

With additional reference to FIG. 2 of the drawings, the power transmitting component 70 with the hydraulic system 126 (FIG. 1) of a first construction is illustrated in more detail and indicated by reference number 126a. The output shaft 150 can be rotatable in a first direction 210. The motor 122 can be reversible to rotate the output shaft 150 in a second direction 214 opposite the first direction 210. The rotational direction of the motor 122 can be reversed by any suitable means such as switching a polarity of electrical power supplied to the motor 122, or by way of a gearbox (not shown) for example.

The actuator 146 can include a piston 218, a housing 222, and an apply plate 226. The actuator 146 can also include a return spring (not shown). The housing 222 can define a cavity 230. The piston 218 can be slidably received in the cavity 230. The piston 218 and piston cavity can have an annular shape. The housing 222 and the piston 218 can define a piston chamber 232. The piston 218 can be coupled to the apply plate 226 to translate the apply plate 226 between a first position and a second position. In the first position, the apply plate 226 can be extended toward the first and second clutch plates 134, 142 to cause the first and second clutch plates 134, 142 to frictionally engage one another to transmit rotary power from the clutch input member 130 to the clutch output member 138. In the second position, the apply plate 226 can be retracted from, or extended a lesser amount toward, the first and second clutch plates 134, 142. In the second position, the first and second clutch plates 134, 142 can be disengaged from one another so that rotary power is not transmitted between the clutch input member 130 and the clutch output member 138. It is understood that the actuator 146 can be configured to be operated in any number of intermediate positions between the first and second positions such that an amount of torque transferred through the second clutch 118 can be controlled or modulated. The return spring (not shown) can be configured to bias the apply plate 226 toward either the first or second position.

The hydraulic system 126a can include a reservoir 238, the actuator 146, a first valve 240, a pump 242, and a fluid storage device 244. The hydraulic system 126a can also include a second valve 246, and a third valve 248. The reservoir 238 can be configured to hold a volume of hydraulic fluid. The reservoir 238 can be fluidly coupled to the piston chamber 232 by a bleed conduit 250. The bleed conduit 250 can be configured to permit a small amount of fluid to flow from the piston chamber 232 to the reservoir 238. The bleed conduit 250 can be a small diameter conduit or can include a restricting element or device configured to limit the flowrate through the bleed conduit 250. The restricting element or device can be configured to only permit fluid to drain from the piston chamber 232 to the reservoir 238 when a pressure in the piston chamber 232 exceeds a predetermined pressure.

The first valve 240 can have a plurality of inlet/outlets, including a first port 254, a second port 256, a third port 258, and a fourth port 260. The fourth port 260 can be coupled for fluid communication with the piston chamber 232 by a first conduit 264. While schematically shown, the first valve 240 can have a valve body (not specifically shown) and a valve element (not specifically shown) that can be movable relative to the valve body between a first position such that the first valve 240 is in a first mode (schematically shown) and a second position such that the first valve 240 is in a second mode (not specifically shown). The movable element can be moved between the first and second positions (i.e. the first valve 240 can be switched between the first and second modes) by any suitable means, such as a solenoid 266 for example.

When the first valve 240 is in the first mode, the first valve 240 can permit fluid communication between the first port 254 and the second port 256. In the first mode, the first valve 240 can inhibit fluid communication between the third port 258 and the fourth port 260. While not specifically shown, the first valve 240 can be configured to permit flow in one direction when in the first mode, such that fluid can flow from the first port 254 to the second port 256, while being inhibited from flowing from the second port 256 to the first port 254.

When the first valve 240 is in the second mode, the first valve 240 can permit fluid communication between the first, third, and fourth ports 254, 258, 260. While not specifically shown, the first valve 240 can be configured to permit flow in one direction from the third port 258 when in the second mode, such that fluid can flow from the third port 258 to the fourth port 260, while being inhibited from flowing from the first and fourth ports 254, 260 to the third port 258.

The pump 242 can be drivingly coupled to the output shaft 150, such that the motor 122 can operate the pump 242 by rotating the output shaft 150. The pump 242 can be any suitable type of pump, such as a gerotor pump for example. The pump 242 can be configured to be operated in a forward mode or a reverse mode such that the pump 242 can be switched between the forward and reverse modes depending on the direction of rotation of the output shaft 150. The pump 242 can have a plurality of inlet/outlets, such as a fifth port 270 and a sixth port 272. The fifth port 270 can be fluidly coupled to the reservoir 238 by a second conduit 274. The sixth port 272 can be fluidly coupled to the first port 254 by a third conduit 276.

The fluid storage device 244 can be a vessel defining a second chamber 280 that is configured to hold a volume of pressurized hydraulic fluid. In the particular example provided, the fluid storage device 244 is an accumulator and the second chamber 280 is partially defined by a movable element 284 which can move to vary the volume of the second chamber 280. In the particular example provided, the fluid storage device is a spring biased accumulator, such that the movable element 284 is biased by a spring to apply pressure to fluid within the second chamber 280, though other types of accumulators can be used. The fluid storage device 244 can have a seventh port 286 and an eighth port 288 in fluid communication with the second chamber 280. The seventh port 286 can be coupled for fluid communication with the second port 256 by a fourth conduit 290. The eighth port 288 can be coupled for fluid communication with the third port 258 by a fifth conduit 292. While not specifically shown, the fluid storage device 244 can alternatively have a single port, such as the seventh port 286 and not include the eighth port 288. In such a construction, the fourth and fifth conduits 290, 292 can be fluidly coupled at a point between the second and third ports 256, 258 and the seventh port 286.

The second valve 246 can be located fluidly in-line with the fourth conduit 290, such that the second valve 246 is located between the second port 256 and the seventh port 286. The second valve 246 can be a one-way valve, such as a check valve, that can permit fluid flow from the second port 256 to the seventh port 286, while inhibiting flow from the seventh port 286 to the second port 256. The third valve 248 can be located fluidly in-line with the fifth conduit 292, such that the third valve 248 is located between the third port 258 and the eighth port 288. The third valve 248 can be a one-way valve, such as a check valve, that can permit fluid flow from the eighth port 288 to the third port 258, while inhibiting flow from the third port 258 to the eighth port 288.

An optional second bleed conduit 296 can fluidly couple the reservoir 238 and the second chamber 280. The second bleed conduit 296 can be configured to permit a small amount of fluid to flow from the second chamber 280 to the reservoir 238. The second bleed conduit 296 can be a small diameter conduit or can include a restricting element or device configured to limit the flowrate through the second bleed conduit 296. The restricting element or device can be configured to only permit fluid to drain from the second chamber 280 to the reservoir 238 when a pressure in the second chamber 280 exceeds a predetermined pressure. The second bleed conduit 296 can be coupled to the fourth conduit 290 between the second valve 246 and the seventh port 286, or can be coupled to the fifth conduit 292 or can be directly coupled to the second chamber 280. The second bleed conduit 296 can be coupled to the bleed conduit 250 or directly to the reservoir 238, though other configurations can be used such that the second bleed conduit 296 can drain to the reservoir 238.

In operation, when the first valve 240 is in the first mode, the pump 242 can be operated in the forward mode to pump fluid from the reservoir 238, through the first valve 240 and into the second chamber 280. The pump 242 can be operated in this manner for a predetermined amount of time, until a predetermined pressure is reached within the second chamber 280, or until fluid is needed in the piston chamber 232. If the pump 242 is shut off, fluid in the second chamber 280 can be held under pressure by the first valve 240 and/or the second valve 246. In this way, a relatively large volume of fluid can be stored at pressure until needed. If the pump 242 remains on or the pressure within the second chamber 280 exceeds a predetermined pressure, then some fluid can be drained via the second bleed conduit 296 to maintain a desired pressure.

When engagement of the first and second clutch plates 134, 142 is desired, the first valve 240 can switch from the first mode to the second mode. In the second mode, the high volume of stored fluid in the second chamber 280 can flow from the fluid storage device 244, through the first valve 240 and into the piston chamber 232 to extend the piston 218 quickly toward the first and second clutch plates 134, 142. The high volume of pressurized fluid from the second chamber 280 can move the piston 218 more quickly than the pump 242 operating alone, which can be configured to operate at higher pressures and lower flowrates. With the first valve 240 in the second mode, the pump 242 can be operated to pump fluid from the reservoir 238, through the first valve 240, and to the piston chamber 232 to fully engage the first and second clutch plates 134, 142. The first valve 240 and/or the third valve 248 can prevent the pump 242 from pumping fluid to the second chamber 280 when the first valve 240 is in the second mode. The bleed conduit 250 can permit some fluid to drain from the piston chamber 232 to the reservoir 238 to maintain a desired pressure in the piston chamber 232. The pressure within the piston chamber 232 can be determined using any suitable device, such as a pressure sensor 294, fluidly coupled to the piston chamber 232. The bleed conduit 250 can also permit air trapped in the hydraulic circuit 126a to bleed to the reservoir 238. The pump 242 can also be operated intermittently or at different speeds to modulate the pressure in the piston chamber 232 in order to modulate the torque transferred by the clutch plates 134, 142.

When disengagement of the first and second clutch plates 134, 142 is desired, the pump 242 can be operated in the reverse mode, with the first valve 240 in the second mode, to pump fluid from the piston chamber 232 to the reservoir 238 to rapidly retract the piston 218.

Figure 3:
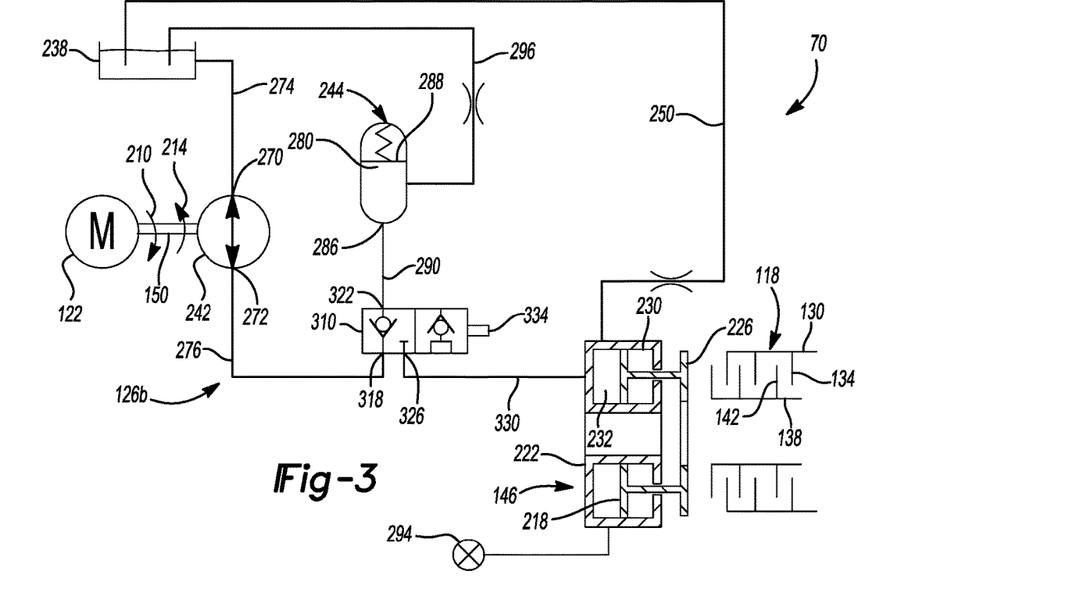
FIG. 3 is a schematic illustration of the power transmitting component of FIG. 1 of a second construction.

With reference to FIG. 3, the power transmitting component 70 with the hydraulic system 126 (FIG. 1) of a second construction is illustrated and indicated by reference number 126b. The hydraulic system 126b can be similar to the hydraulic system 126a, except as illustrated and described below. The descriptions of like numbered elements are incorporated herein by reference and will not be repeated. The hydraulic system 126b can include the reservoir 238, the actuator 146, a first valve 310, the pump 242, and the fluid storage device 244.

The first valve 310 can have a plurality of inlet/outlets, including a first port 318, a second port 322, and a third port 326. The third port 326 can be coupled for fluid communication with the piston chamber 232 by a first conduit 330. While schematically shown, first valve 310 can have a valve body (not specifically shown) and a valve element (not specifically shown) that can be movable relative to the valve body between a first position such that the first valve 310 is in a first mode (schematically shown) and a second position such that the first valve 310 is in a second mode (not specifically shown). The movable element can be moved between the first and second positions (i.e. the first valve 310 can be switched between the first and second modes) by any suitable means, such as a solenoid 334 for example.

When the first valve 310 is in the first mode, the first valve 310 can permit fluid communication between the first port 318 and the second port 322. In the first mode, the first valve 310 can inhibit fluid communication between the third port 326 and the first and second ports 318, 322. The first valve 310 can be configured to permit flow in one direction when in the first mode, such that fluid can flow from the first port 318 to the second port 322, while being inhibited from flowing from the second port 322 to the first port 318.

When the first valve 310 is in the second mode, the first valve 310 can permit fluid communication between the first, second, and third ports 318, 322, 326. The first valve 310 can be configured to permit flow in one direction from the second port 322 when in the second mode, such that fluid can flow from the second port 322 to the third port 326, while being inhibited from flowing from the first and third ports 318, 326 to the second port 322.

The pump 242 can have the fifth port 270 that can be fluidly coupled to the reservoir 238 by the second conduit 274, and the sixth port 272 that can be fluidly coupled to the first port 318 by the third conduit 276. The fluid storage device 244 can include the seventh port 286 and not include the eighth port 288 (FIG. 2) and the fifth conduit 292 (FIG. 2). The seventh port 286 can be fluidly coupled to the second port 322 by the fourth conduit 290. The second bleed conduit 296 can be configured as described above with reference to FIG. 2 to fluidly couple the second chamber 280 with the reservoir 238. The second bleed conduit 296 can be coupled to the fourth conduit 290 or directly to the second chamber 280 for example.

In operation, the hydraulic system 126b can function similarly to the hydraulic system 126a. When the first valve 310 is in the first mode, the pump 242 can be operated in the forward mode to pump fluid from the reservoir 238, through the first valve 310 and into the second chamber 280. The pump 242 can be operated in this manner for a predetermined amount of time, until a predetermined pressure is reached within the second chamber 280, or until fluid is needed in the piston chamber 232. If the pump 242 is shut off, fluid in the second chamber 280 can be held under pressure by the first valve 310. In this way, a relatively large volume of fluid can be stored at pressure until needed. If the pump 242 remains on or the pressure within the second chamber 280 exceeds a predetermined pressure, then some fluid can be drained via the second bleed conduit 296 to maintain a desired pressure.

When engagement of the first and second clutch plates 134, 142 is desired, the first valve 310 can switch from the first mode to the second mode. In the second mode, the high volume of stored fluid in the second chamber 280 can flow from the fluid storage device 244, through the first valve 310 and into the piston chamber 232 to extend the piston 218 quickly toward the first and second clutch plates 134, 142. The high volume of pressurized fluid from the second chamber 280 can move the piston 218 more quickly than the pump 242 operating alone, which can be configured to operate at higher pressures and lower flowrates. With the first valve 310 in the second mode, the pump 242 can be operated to pump fluid from the reservoir 238, through the first valve 310, and to the piston chamber 232 to fully engage the first and second clutch plates 134, 142. The first valve 310 can prevent the pump 242 from pumping fluid to the second chamber 280 when the first valve 310 is in the second mode. The bleed conduit 250 can permit some fluid to drain from the piston chamber 232 to the reservoir 238 to maintain a desired pressure in the piston chamber 232. The pressure within the piston chamber 232 can be determined using any suitable device, such as pressure sensor 294, fluidly coupled to the piston chamber 232. The bleed conduit 250 can also permit air trapped in the hydraulic circuit 126b to bleed to the reservoir 238. The pump 242 can also be operated intermittently or at different speeds to modulate the pressure in the piston chamber 232 in order to modulate the torque transferred by the clutch plates 134, 142.

When disengagement of the first and second clutch plates 134, 142 is desired, the pump 242 can be operated in the reverse mode, with the first valve 310 in the second mode, to pump fluid from the piston chamber 232 to the reservoir 238 to rapidly retract the piston 218.

Figure 4:
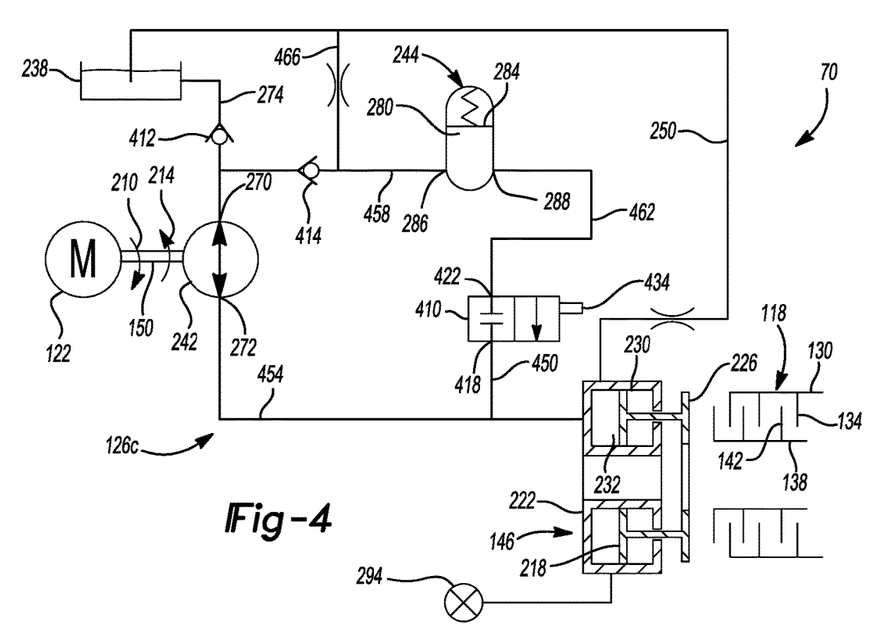
FIG. 4 is a schematic illustration of the power transmitting component of FIG. 1 of a third construction.

With reference to FIG. 4, the power transmitting component 70 with the hydraulic system 126 (FIG. 1) of a second construction is illustrated and indicated by reference number 126c. The hydraulic system 126c can be similar to the hydraulic systems 126a and 126b, except as illustrated and described below. The descriptions of like numbered elements are incorporated herein by reference and will not be repeated. The hydraulic system 126c can include the reservoir 238, the actuator 146, a first valve 410, a second valve 412, a third valve 414, the pump 242, and the fluid storage device 244

The first valve 410 can have a plurality of inlet/outlets, including a first port 418, and a second port 422. While schematically shown, the first valve 410 can have a valve body (not specifically shown) and a valve element (not specifically shown) that can be movable relative to the valve body between a first position such that the first valve 410 is in a first mode (schematically shown) and a second position such that the first valve 410 is in a second mode (not specifically shown). The movable element can be moved between the first and second positions (i.e. the first valve 410 can be switched between the first and second modes) by any suitable means, such as a solenoid 434 for example.

When the first valve 410 is in the first mode, the first valve 410 can inhibit fluid communication between the first port 418 and the second port 422. When the first valve 410 is in the second mode, the first valve 410 can permit fluid communication between the first and second ports 418, 422. The first valve 410 can be configured to permit flow in one direction from the second port 422 when in the second mode, such that fluid can flow from the second port 422 to the first port 418, while being inhibited from flowing from the first port 418 to the second port 422. The first port 418 can be fluidly coupled to the piston chamber 232 by a first conduit 450.

The pump 242 can have the fifth port 270 that can be fluidly coupled to the reservoir 238 by the second conduit 274, and the sixth port 272 that can be fluidly coupled to the piston chamber 232 by a third conduit 454. The fluid storage device 244 can include the seventh port 286 and the eighth port 288. The seventh port 286 can be fluidly coupled to the fifth port 270 by a fourth conduit 458. The eighth port 288 can be fluidly coupled to the second port 422 by a fifth conduit 462.

The second valve 412 can be located fluidly in-line with the second conduit 274, such that the second valve 412 is located between the reservoir 238 and the fifth port 270. The second valve 412 can be a one-way valve, such as a check valve, that can permit fluid flow from the reservoir 238 to the fifth port 270, while inhibiting flow from the fifth port 270 to the reservoir 238. The third valve 414 can be located fluidly in-line with the fourth conduit 458, such that the third valve 414 is located between the fifth port 270 and the seventh port 286. The third valve 414 can be a one-way valve, such as a check valve, that can permit fluid flow from the fifth port 270 to the seventh port 286, while inhibiting flow from the seventh port 286 to the fifth port 270. The fourth conduit 458 can be coupled to the second conduit 274 at a location that is between the second valve 412 and the fifth port 270. A second bleed conduit 466 can also fluidly couple the second chamber 280 with the reservoir 238. The second bleed conduit 466 can be configured to permit a small amount of fluid to flow from the second chamber 280 to the reservoir 238. The second bleed conduit 466 can be a small diameter conduit or can include a restricting element or device configured to limit the flowrate through the second bleed conduit 466. The restricting element or device can be configured to only permit fluid to drain from the second chamber 280 to the reservoir 238 when a pressure in the second chamber 280 exceeds a predetermined pressure. In the example provided, the second bleed conduit 466 is illustrated as coupled to the fourth conduit 458 between the third valve 414 and the seventh port 286, though other configurations can be used. For example, the second bleed conduit 466 can be alternatively coupled to the fifth conduit 462 or directly coupled to the second chamber 280. In the example provided, the second bleed conduit 466 is coupled to the bleed conduit 250, though other configurations can be used such that the second bleed conduit 466 can drain to the reservoir 238.

In operation, when the first valve 410 is in the first mode, the pump 242 can be operated in the reverse mode to pump fluid from the piston chamber 232, through the third valve 414, and into the second chamber 280. The second valve 412 can inhibit the pump 242 from pumping fluid into the reservoir 238. The pump 242 can be operated in this manner for a predetermined amount of time, until a predetermined pressure is reached within the second chamber 280, until fluid is needed in the piston chamber 232, or until insufficient fluid remains in the piston chamber 232. If the pump 242 is shut off, fluid in the second chamber 280 can be held under pressure by the first valve 410 and the third valve 414. In this way, a relatively large volume of fluid can be stored at pressure until needed. If the pressure within the second chamber 280 exceeds a predetermined pressure, then some fluid can be drained via the second bleed conduit 466 to maintain a desired pressure.

When engagement of the first and second clutch plates 134, 142 is desired, the first valve 410 can switch from the first mode to the second mode. In the second mode, the high volume of stored fluid in the second chamber 280 can flow from the fluid storage device 244, through the first valve 410 and into the piston chamber 232 to extend the piston 218 quickly toward the first and second clutch plates 134, 142. The high volume of pressurized fluid from the second chamber 280 can move the piston 218 more quickly than the pump 242 operating alone, which can be configured to operate at higher pressures and lower flowrates. With the first valve 410 in the first or second mode, the pump 242 can be operated in the forward mode to pump fluid from the reservoir 238, through the third conduit 454, and to the piston chamber 232 to fully engage the first and second clutch plates 134, 142. The first valve 410 can prevent the pump 242 from pumping fluid to the second chamber 280 when the first valve 240 is in the second mode, or can be switched back to the first mode to inhibit fluid communication between the first and second ports 418, 422. The bleed conduit 250 can permit some fluid to drain from the piston chamber 232 to the reservoir 238 to maintain a desired pressure in the piston chamber 232. The pressure within the piston chamber 232 can be determined using any suitable device, such as pressure sensor 294, fluidly coupled to the piston chamber 232. The bleed conduit 250 can also permit air trapped in the hydraulic circuit 126c to bleed to the reservoir 238. The pump 242 can also be operated intermittently or at different speeds to modulate the pressure in the piston chamber 232 in order to modulate the torque transferred by the clutch plates 134, 142.

When disengagement of the first and second clutch plates 134, 142 is desired, the pump 242 can be operated in the reverse mode, with the first valve 240 in the first mode, to pump fluid from the piston chamber 232 to the second chamber 280 to rapidly retract the piston 218.

Figure 5:
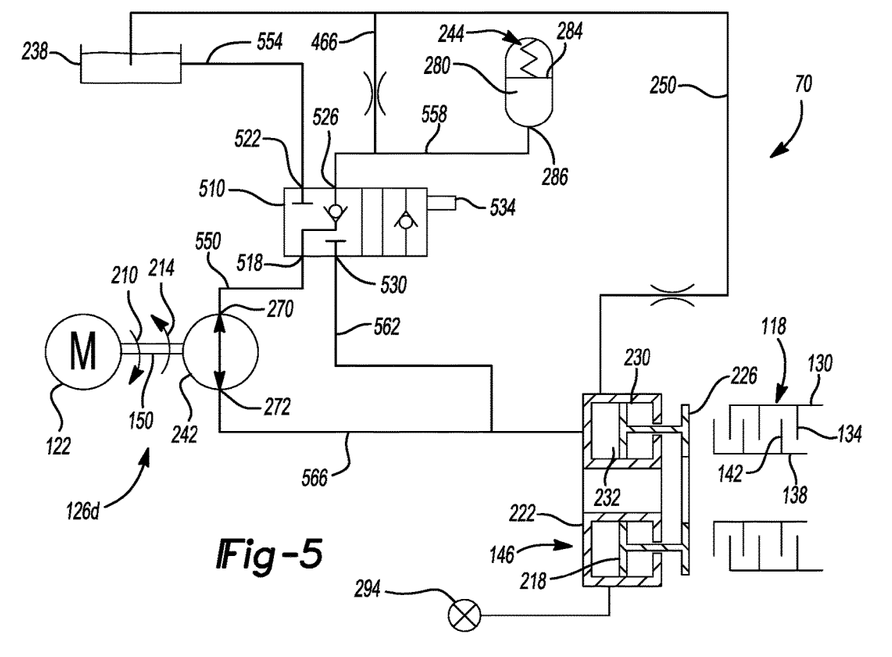
FIG. 5 is a schematic illustration of the power transmitting component of FIG. 1 of a fourth construction.

With reference to FIG. 5, the power transmitting component 70 with the hydraulic system 126 (FIG. 1) of a fourth construction is illustrated and indicated by reference number 126d. The hydraulic system 126d can be similar to the hydraulic system 126c, except as illustrated and described below. The descriptions of like numbered elements are incorporated herein by reference and will not be repeated. The hydraulic system 126d can include the reservoir 238, the actuator 146, a first valve 510, the pump 242, and the fluid storage device 244.

The first valve 510 can have a plurality of inlet/outlets, including a first port 518, a second port 522, a third port 526, and a fourth port 530. While schematically shown, the first valve 510 can have a valve body (not specifically shown) and a valve element (not specifically shown) that can be movable relative to the valve body between a first position such that the first valve 510 is in a first mode (schematically shown) and a second position such that the first valve 510 is in a second mode (not specifically shown). The movable element can be moved between the first and second positions (i.e. the first valve 510 can be switched between the first and second modes) by any suitable means, such as a solenoid 534 for example. The first port 518 can be coupled for fluid communication with the fifth port 270 of the pump 242 by a first conduit 550. The second port 522 can be coupled for fluid communication with the reservoir 238 by a second conduit 554. The third port 526 can be coupled for fluid communication with the seventh port 286 of the fluid storage device 244 by a third conduit 558. The fourth port 530 can be coupled for fluid communication with the piston chamber 232 by a fourth conduit 562.

When the first valve 510 is in the first mode, the first valve 510 can permit fluid communication between the first port 518 and the third port 526. In the first mode, the first valve 510 can inhibit fluid communication between the second port 522 and the first, third, and fourth ports 518, 526, 530. In the first mode, the first valve can inhibit fluid communication between the fourth port 530 and the first, second, and third ports 518, 522, 526. The first valve 510 can be configured to permit flow in one direction when in the first mode, such that fluid can flow from the first port 518 to the third port 526, while being inhibited from flowing from the third port 526 to the first port 518.

When the first valve 510 is in the second mode, the first valve 510 can permit fluid communication between the first port 518 and the second port 522. In the second mode, the first valve 510 can permit fluid communication between the third port 526 and the fourth port 530. In the second mode, the first valve 510 can inhibit fluid communication between the first port 518 and the third and fourth ports 526, 530. In the second mode, the first valve 510 can inhibit fluid communication between the second port 522 and the third and fourth ports 526, 530. The first valve 510 can be configured to permit flow in one direction from the third port 526 when in the second mode, such that fluid can flow from the third port 526 to the fourth port 530, while being inhibited from flowing from the fourth port 530 to the third port 526.

The sixth port 272 of the pump 242 can be fluidly coupled to the piston chamber 232 by a fifth conduit 566. In the particular example shown, the fluid storage device 244 can include the seventh port 286 and not include the eighth port 288 (FIG. 2). The second bleed conduit 466 can be configured as described above with reference to FIG. 2 to fluidly couple the second chamber 280 with the reservoir 238. The second bleed conduit 466 can be coupled to the third conduit 558 or directly to the second chamber 280 for example.

The operation of the hydraulic system 126d can be similar to the operation of hydraulic system 126c described above. When the first valve 510 is in the first mode, the pump 242 can be operated in the reverse mode to pump fluid from the piston chamber 232, through the first valve 510, and into the second chamber 280. The first valve 510 can inhibit the pump 242 from pumping fluid into the reservoir 238. The pump 242 can be operated in this manner for a predetermined amount of time, until a predetermined pressure is reached within the second chamber 280, until fluid is needed in the piston chamber 232, or until insufficient fluid remains in the piston chamber 232. If the pump 242 is shut off, fluid in the second chamber 280 can be held under pressure by the first valve 510 in the first mode. In this way, a relatively large volume of fluid can be stored at pressure until needed. If the pressure within the second chamber 280 exceeds a predetermined pressure, then some fluid can be drained via the second bleed conduit 466 to maintain a desired pressure.

When engagement of the first and second clutch plates 134, 142 is desired, the first valve 510 can switch from the first mode to the second mode. In the second mode, the high volume of stored fluid in the second chamber 280 can flow from the fluid storage device 244, through the first valve 510 and into the piston chamber 232 to extend the piston 218 quickly toward the first and second clutch plates 134, 142. The high volume of pressurized fluid from the second chamber 280 can move the piston 218 more quickly than the pump 242 operating alone, which can be configured to operate at higher pressures and lower flowrates. With the first valve 510 in the second mode, the pump 242 can be operated in the forward mode to pump fluid from the reservoir 238, through the first valve 510, and to the piston chamber 232 to fully engage the first and second clutch plates 134, 142. The first valve 510 can prevent the pump 242 from pumping fluid to the second chamber 280 when the first valve 510 is in the second mode. The bleed conduit 250 can permit some fluid to drain from the piston chamber 232 to the reservoir 238 to maintain a desired pressure in the piston chamber 232. The pressure within the piston chamber 232 can be determined using any suitable device, such as pressure sensor 294, fluidly coupled to the piston chamber 232. The bleed conduit 250 can also permit air trapped in the hydraulic circuit 126d to bleed to the reservoir 238. The pump 242 can also be operated intermittently or at different speeds to modulate the pressure in the piston chamber 232 in order to modulate the torque transferred by the clutch plates 134, 142.

When disengagement of the first and second clutch plates 134, 142 is desired, the first valve 510 can be switched back to the first mode and the pump 242 can be operated in the reverse mode to pump fluid from the piston chamber 232 to the second chamber 280 to rapidly retract the piston 218. It is understood that the pump 242 can also be operated in the reverse mode with the first valve 510 in the second mode to pump fluid from both the piston chamber 232 and the second chamber 280 to the reservoir 238.

Figure 6:
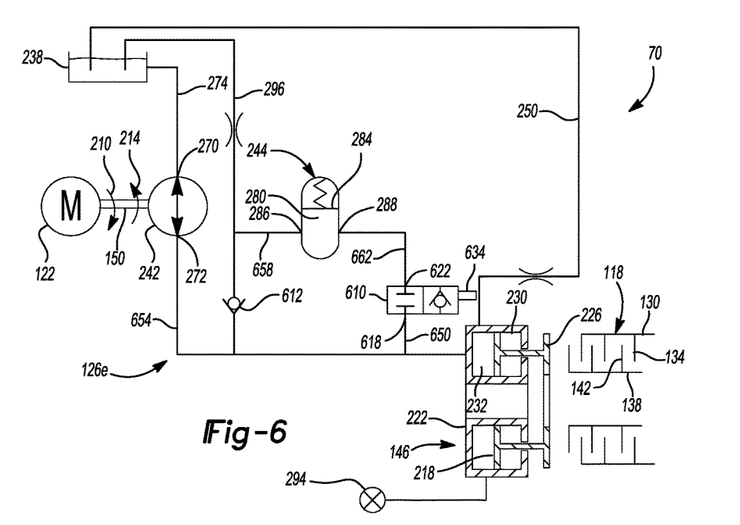
FIG. 6 is a schematic illustration of the power transmitting component of FIG. 1 of a fifth construction.

With reference to FIG. 6, the power transmitting component 70 with the hydraulic system 126 (FIG. 1) of a fifth construction is illustrated and indicated by reference number 126e. The hydraulic system 126e can be similar to the hydraulic systems 126a, 126b, 126c, and 126d, except as illustrated and described below. The descriptions of like numbered elements are incorporated herein by reference and will not be repeated. The hydraulic system 126e can include the reservoir 238, the actuator 146, a first valve 610, a second valve 612, the pump 242, and the fluid storage device 244.

The first valve 610 can have a plurality of inlet/outlets, including a first port 618, and a second port 622. While schematically shown, first valve 610 can have a valve body (not specifically shown) and a valve element (not specifically shown) that can be movable relative to the valve body between a first position such that the first valve 610 is in a first mode (schematically shown) and a second position such that the first valve 610 is in a second mode (not specifically shown). The movable element can be moved between the first and second positions (i.e. the first valve 610 can be switched between the first and second modes) by any suitable means, such as a solenoid 634 for example.

When the first valve 610 is in the first mode, the first valve 610 can inhibit fluid communication between the first port 618 and the second port 622. When the first valve 610 is in the second mode, the first valve 610 can permit fluid communication between the first and second ports 618, 622. The first valve 610 can be configured to permit flow in one direction from the second port 622 when in the second mode, such that fluid can flow from the second port 622 to the first port 618, while being inhibited from flowing from the first port 618 to the second port 622. The first port 618 can be fluidly coupled to the piston chamber 232 by a first conduit 650.

The pump 242 can have the fifth port 270 that can be fluidly coupled to the reservoir 238 by the second conduit 274, and the sixth port 272 that can be fluidly coupled to the piston chamber 232 by a third conduit 654. The fluid storage device 244 can include the seventh port 286 and the eighth port 288. The seventh port 286 can be fluidly coupled to the sixth port 272 by a fourth conduit 658. In the example provided, the fourth conduit 658 is coupled to the third conduit 654 at a location between the sixth port 272 and the piston chamber 232, though other configurations can be used. For example, the fourth conduit 658 can alternatively be coupled to the first conduit 650 or to the piston chamber 232 to receive fluid from the pump 242. The eighth port 288 can be fluidly coupled to the second port 622 by a fifth conduit 662.

The second valve 612 can be located fluidly in-line with the fourth conduit 658, such that the second valve 612 is located along the fourth conduit 658 between the sixth port 272 and the seventh port 286. The second valve 612 can be a one-way valve, such as a check valve, that can permit fluid flow from the sixth port 272 to the seventh port 286, while inhibiting flow from the seventh port 286 to the sixth port 272. The second valve 612 can have a predetermined crack pressure, such that the second valve 612 can inhibit fluid flow through the fourth conduit 658 to the fluid storage device 244 when the pressure in the third conduit 654 is below the predetermined crack pressure.

An optional second bleed conduit 296 can fluidly couple the reservoir 238 and the second chamber 280. The second bleed conduit 296 can be configured to permit a small amount of fluid to flow from the second chamber 280 to the reservoir 238. The second bleed conduit 296 can be a small diameter conduit or can include a restricting element or device configured to limit the flowrate through the second bleed conduit 296. The restricting element or device can be configured to only permit fluid to drain from the second chamber 280 to the reservoir 238 when a pressure in the second chamber 280 exceeds a predetermined pressure. The second bleed conduit 296 can be coupled to the fourth conduit 658 between the second valve 612 and the seventh port 286, or can be coupled to the fifth conduit 662 or can be directly coupled to the second chamber 280. The second bleed conduit 296 can be coupled to the bleed conduit 250 or directly to the reservoir 238, though other configurations can be used such that the second bleed conduit 296 can drain to the reservoir 238.

In operation, when the first valve 610 is in the first mode, the pump 242 can be operated in the forward mode to pump fluid from the reservoir 238, through the third conduit 654 and into the piston chamber 232. The pump 242 can be operated in this manner until a predetermined pressure is reached within the piston chamber 232. Once the predetermined pressure is exceeded, such as when the first and second clutch plates 134, 142, are fully engaged and the pump 242 continues to supply fluid for example, the second valve 612 can open to permit fluid to flow into the second chamber 280. If the pump 242 is shut off, fluid in the second chamber 280 can be held under pressure by the first valve 610 and the second valve 612. In this way, a relatively large volume of fluid can be stored at pressure until needed. If the pump 242 remains on or the pressure within the second chamber 280 exceeds a predetermined pressure for the second chamber 280, then some fluid can be drained via the second bleed conduit 296 to maintain a desired pressure. Fluid can also be drained from the piston chamber 232 via the bleed conduit 250 to maintain desired pressure therein. The pressure within the piston chamber 232 can be determined using any suitable device, such as pressure sensor 294, fluidly coupled to the piston chamber 232. The bleed conduit 250 can also permit air trapped in the hydraulic circuit 126e to bleed to the reservoir 238. The pump 242 can also be operated intermittently or at different speeds to modulate the pressure in the piston chamber 232 in order to modulate the torque transferred by the clutch plates 134, 142.

When disengagement of the first and second clutch plates 134, 142 is desired, the pump 242 can be operated in the reverse mode, with the first valve 610 in the first mode, to pump fluid from the piston chamber 232 to the reservoir 238 to rapidly retract the piston 218.

When engagement of the first and second clutch plates 134, 142 is desired, the first valve 610 can switch from the first mode to the second mode. In the second mode, the high volume of stored fluid in the second chamber 280 can flow from the fluid storage device 244, through the first valve 610 and into the piston chamber 232 to extend the piston 218 quickly toward the first and second clutch plates 134, 142. The high volume of pressurized fluid from the second chamber 280 can move the piston 218 more quickly than the pump 242 operating alone, which can be configured to operate at higher pressures and lower flowrates. With the first valve 610 in the second mode, the pump 242 can be operated to pump fluid from the reservoir 238, through the third conduit 654, and to the piston chamber 232 to fully engage the first and second clutch plates 134, 142. The first valve 610 can prevent the pump 242 from pumping fluid to the second chamber 280 when the first valve 610 is in the first or second modes. The second valve 612 can prevent the pump 242 from pumping fluid to the second chamber 280 until the predetermined pressure is exceeded within the piston chamber 232 to open the second valve 612. The bleed conduit 250 can permit some fluid to drain from the piston chamber 232 to the reservoir 238 to maintain a desired pressure in the piston chamber 232.

Figure 7:
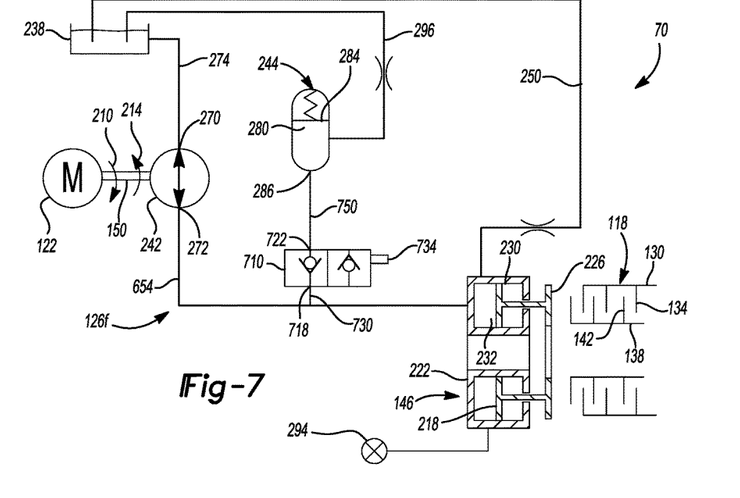
FIG. 7 is a schematic illustration of the power transmitting component of FIG. 1 of a sixth construction.

With reference to FIG. 7, the power transmitting component 70 with the hydraulic system 126 (FIG. 1) of a sixth construction is illustrated and indicated by reference number 126f. The hydraulic system 126f can be similar to the hydraulic system 126e except as illustrated and described below. The descriptions of like numbered elements are incorporated herein by reference and will not be repeated. The hydraulic system 126f can include the reservoir 238, the actuator 146, a first valve 710, the pump 242, and the fluid storage device 244.

The first valve 710 can have a plurality of inlet/outlets, including a first port 718, and a second port 722. The first port 718 can be coupled for fluid communication with the third conduit 654 by a first conduit 730, for fluid communication with the piston chamber 232. The first port 718 can alternatively be coupled directly to the piston chamber 232 by the first conduit 730. While schematically shown, the first valve 710 can have a valve body (not specifically shown) and a valve element (not specifically shown) that can be movable relative to the valve body between a first position such that the first valve 710 is in a first mode (schematically shown) and a second position such that the first valve 710 is in a second mode (not specifically shown). The movable element can be moved between the first and second positions (i.e. the first valve 710 can be switched between the first and second modes) by any suitable means, such as a solenoid 734 for example.

In the hydraulic system 126f, the fluid storage device 244 can include the seventh port 286 and not include the eighth port 288 (FIG. 2) and the fifth conduit 292 (FIG. 2). The seventh port 286 can be fluidly coupled to the second port 722 by a fourth conduit 750. The second bleed conduit 296 can be configured as described above with reference to FIG. 2 to fluidly couple the second chamber 280 with the reservoir 238. The second bleed conduit 296 can be coupled to the fourth conduit 290 or directly to the second chamber 280 for example. The pump 242 can have the fifth port 270 that can be fluidly coupled to the reservoir 238 by the second conduit 274, and the sixth port 272 that can be fluidly coupled to the first port 718 by the third conduit 654.

When the first valve 710 is in the first mode, the first valve 710 can permit fluid communication between the first port 718 and the second port 722. In the example illustrated, the first valve 710 can be configured to only permit fluid to flow in one direction through the second port 722 when in the first mode, such that the first valve 710 can permit fluid to flow from the first port 718 to the fluid storage device 244 while inhibiting flow from the fluid storage device 244 to the first port 718. In the first mode, the first valve 710 can also be configured such that the first valve 710 inhibits fluid flow to the fluid storage device 244 when the pressure at the first port 718 (e.g. the pressure of the piston chamber 232) is below a predetermined pressure.

When the first valve 710 is in the second mode, the first valve 710 can permit fluid communication between the first and second ports 718, 722. The first valve 710 can be configured to permit flow in one direction from the second port 722 when in the second mode, such that fluid can flow from the fluid storage device 244 to the first port 718, while being inhibited from flowing from the first port 718 to the fluid storage device 244.

In operation, the hydraulic system 126f can operate similar to the hydraulic system 126e. When the first valve 710 is in the first mode, the pump 242 can be operated in the forward mode to pump fluid from the reservoir 238, through the third conduit 654, and into the piston chamber 232. The pump 242 can be operated in this manner until a predetermined pressure is reached within the piston chamber 232. For example, the predetermined pressure can be reached when the first and second clutch plates 134, 142 are fully engaged and the pump 242 continues to supply fluid. Once the pressure in the piston chamber 232 (or the first or third conduits 730, 654) is greater than the predetermined pressure, the first valve 710 can permit fluid to flow through the second port 722 and into the second chamber 280. If the pump 242 is shut off, fluid in the second chamber 280 can be held under pressure by the first valve 710. In this way, a relatively large volume of fluid can be stored at pressure until needed. If the pump 242 remains on or the pressure within the second chamber 280 exceeds a predetermined pressure for the second chamber 280, then some fluid can be drained via the second bleed conduit 296 to maintain a desired pressure. Fluid can also be drained from the piston chamber 232 via the bleed conduit 250 to maintain desired pressure therein. The pressure within the piston chamber 232 can be determined using any suitable device, such as pressure sensor 294, fluidly coupled to the piston chamber 232. The bleed conduit 250 can also permit air trapped in the hydraulic system 126f to bleed to the reservoir 238. The pump 242 can also be operated intermittently or at different speeds to modulate the pressure in the piston chamber 232 in order to modulate the torque transferred by the clutch plates 134, 142.

When disengagement of the first and second clutch plates 134, 142 is desired, the pump 242 can be operated in the reverse mode, with the first valve 710 in the first mode, to pump fluid from the piston chamber 232 to the reservoir 238 to rapidly retract the piston 218.

When engagement of the first and second clutch plates 134, 142 is desired, the first valve 710 can switch from the first mode to the second mode. In the second mode, the high volume of stored fluid in the second chamber 280 can flow from the fluid storage device 244, through the first valve 710 and into the piston chamber 232 to extend the piston 218 quickly toward the first and second clutch plates 134, 142. The high volume of pressurized fluid from the second chamber 280 can move the piston 218 more quickly than the pump 242 operating alone, which can be configured to operate at higher pressures and lower flowrates. With the first valve 710 in the second mode, the pump 242 can be operated to pump fluid from the reservoir 238, through the third conduit 654, and to the piston chamber 232 to fully engage the first and second clutch plates 134, 142. The first valve 710 can prevent the pump 242 from pumping fluid to the second chamber 280 when the first valve 710 is in the second mode. The bleed conduit 250 can permit some fluid to drain from the piston chamber 232 to the reservoir 238 to maintain a desired pressure in the piston chamber 232. The first valve 710 can be switched back to the first mode and the first valve 710 can prevent the pump 242 from pumping fluid to the second chamber 280 until the predetermined pressure is exceeded within the piston chamber 232 to open the first valve 710 to the second port 722.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A power transmitting component comprising:
   a friction clutch having a plurality of first clutch plates and a plurality of second clutch plates that are interleaved with the first clutch plates;
   a reservoir configured to hold hydraulic fluid;
   a hydraulic ram coupled to the friction clutch, the hydraulic ram having a piston chamber and a piston that is movable in the piston chamber between a first position which is retracted relative to the first and second clutch plates, and a second position in which the piston is extended toward the first and second clutch plates to a greater extent than when the piston is in the first position;
   a pump having a first inlet/outlet and a second inlet/outlet, the first inlet/outlet being coupled for fluid communication to the reservoir;
   a fluid storage device configured to hold a volume of pressurized hydraulic fluid; and
   a first valve coupled for fluid communication with the piston chamber, the second inlet/outlet of the pump, and the fluid storage device, the first valve being operable in a first mode and a second mode;
   wherein the first valve is configured to permit fluid communication between the pump and the fluid storage device, to inhibit fluid communication between the piston chamber and the pump, and to inhibit fluid communication between the piston chamber and the fluid storage device when the first valve is in the first mode; and
   wherein the first valve is configured to permit fluid communication between the pump and the piston chamber, and to permit fluid communication between the fluid storage device and the piston chamber when the first valve is in the second mode.

2. The power transmitting component of claim 1, further comprising a bleed conduit coupled for fluid communication with the piston chamber and the reservoir.

3. The power transmitting component of claim 1, wherein the pump is operable in a first mode and a second mode, the pump being configured to pump hydraulic fluid out the second inlet/outlet when in the first mode, and being configured to pump hydraulic fluid out the first inlet/outlet when in the second mode.

4. The power transmitting component of claim 1, further comprising a first valve element configured to permit fluid communication from the pump to the fluid storage device and to inhibit fluid communication from the fluid storage device to the pump when the first valve is in the first mode.

5. The power transmitting component of claim 4, further comprising a second valve element configured to permit fluid communication from the fluid storage device to the piston chamber and to inhibit fluid communication from the pump and piston chamber to the fluid storage device when the first valve is in the second position.

6. The power transmitting component of claim 5, wherein at least one of the first and second valve elements is disposed within the first valve.

7. The power transmitting component of claim 1, further comprising a bleed conduit coupled for fluid communication with the fluid storage device and the reservoir.

8. The power transmitting component of claim 1, wherein the fluid storage device includes a movable element, the movable element partially defining a second chamber and configured to apply pressure on hydraulic fluid within the second chamber.

* * * * *